Nov. 17, 1942.   B. BRONFMAN   2,302,179
METHOD OF PRINTING TRANSPARENT ADHESIVE TAPE
Filed April 4, 1941

Inventor
BENJAMIN BRONFMAN,
By Bennett H. Levenson.
Attorney

Patented Nov. 17, 1942

2,302,179

UNITED STATES PATENT OFFICE 2,302,179

METHOD OF PRINTING TRANSPARENT ADHESIVE TAPE

Benjamin Bronfman, Newtonville, Mass.

Application April 4, 1941, Serial No. 386,954

10 Claims. (Cl. 101—426)

This invention relates to the art of printing. More particularly it pertains to the production of an adhesive sheet supplied with printing material upon the adhesive coating or surface, and embraces among its features novelty of method and resulting product.

While the invention is of substantial scope and application, a primary embodiment thereof includes a transparent tape provided with a tacky, pressure sensitive adhesive coated surface, and appropriately supplied with printing material such as a printing ink or pigment, having essential characteristics. Although the following considerations are in substantial measure directed to a reference of the so-called "Scotch" tape, it is to be understood that this is merely by way of illustration of a preferred embodiment; any well known type of transparent adhesive tape or sheet material may be used as a base for the production of the new article of manufacture and as an element in the novel process disclosed in connection with the obtention of such article.

The utilization of adhesive material, exemplified by Scotch tape, has been substantially restricted to the adhering characteristics; thus, this type of material has gained extremely wide application in connection with the wrapping of packages or analogous functions of attachment. Notwithstanding the known desirability of adapting the tape surfaces for advertising and similar purposes, this has generally proven to be impractical in view of the attendant problems involved. For example, applying a printing material to the glazed surface has undesirably necessitated resort to the use of special types, and attempts to supply the printing material directly over the adhesive have been unsatisfactory for reasons which include the tendency of adhesive to cause the ink to spread or run.

Efforts to obviate these difficulties have been largely based upon the application of the printing material to a tape surface prior to a coating thereof with the requisite adhesive substance; the obvious disadvantage of pre-printing the tape has rendered such procedure a comparatively costly advertising expedient, and generally unfeasible. While it is known to apply a mucilaginous adhesive composition to a glazed paper surface and print thereon, this method also embraces a number of disadvantages, such as the necessity for subsequent drying and lack of stability of the printed material upon the adhesive coated tape. In any event, there has been no suggestion heretofore of a solution of the promlem of effectively applying printed material to a tacky, pressure sensitive adhesive coating on a sheet, preferably of the transparent glazed paper type; nor has any product been attainable manifesting the desirable characteristics of that herein disclosed.

It is an object of my invention to obviate such difficulties and uncertainties as hereinabove referred to by a novel method for producing an improved new product.

Another object is to obtain a sheet coated with a tacky, pressure sensitive adhesive, and supplied with a printing material impressed upon said adhesive surface.

An additional object of the invention is to produce a transparent adhesive tape having a substantially dry pigmentary material impressed on the tacky, pressure sensitive adhesive coating of the said tape.

It is an added object to provide a transparent adhesive tape having printed matter impressed upon the tacky, pressure sensitive adhesive coating of the said tape, which printed matter is in a stable manner affixed to the adhesive, clearly visible, and substantially devoid of smearing tendencies.

A further object of the invention is to devise a method for attaining products of the type specified above.

Other objects, advantages, and features of my invention will become apparent from the following description to be read in connection with the accompanying drawing, in which similar elements are designated by like numerals:

Pursuant to the present invention it has been discovered through extensive research and experimentation that a quick drying ink, and more effectively in the form of discrete particles, exemplified by a substantially dry powdered pigmentary ink may be impressed upon a tacky, pressure sensitive adhesive surface without the attendant shortcomings of the prior art referred to hereinabove. While various types and colors of ink are applicable, it is a prerequisite that no drying treatment is essential. The preferred embodiment of the invention, which functions most desirably and effectively, is based upon the utilization of the substantially dry pigmentary ink of any desirable formula. It has been found that impressing such pigmentary powder, as by a printing roller, on the tacky, pressure sensitive coating of a transparent material illustrated by Cellophane, results in a well defined, clearly visible, non-smearing print.

Figure 1:
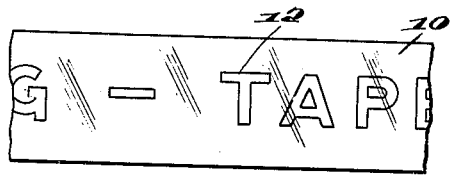
Figure 1 is a top plan view of a portion of the article of this invention.
Figure 3:
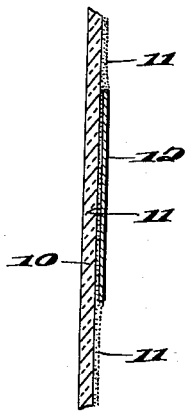
Figure 3 is an enlarged sectional view taken on the line 3—3 of Figure 2.
Figure 2:
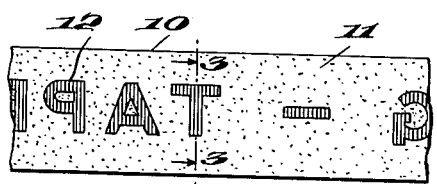
Figure 2 is a corresponding bottom view of the portion shown in Figure 1.

The well defined printing impressed upon a transparent tape or sheet of material, illustrated by Cellophane coated with a tacky, pressure sensitive adhesive or by so-called "Scotch" tape, is clearly apparent from a reference to Figures 1–3 of the drawing wherein the base or sheet carrier is designated by the numeral 10. Applied to one side of this material is the adhesive 11, and impressed upon the adhesive is the printing material indicated by 12. This printing may be provided in any known manner and by any type of printing machine, and is applicable to either raised or engraved printing. The essential requisite is that the ink be of a suitable type, and preferably in the form of discrete particles, such as a substantially dry powder.

Figure 4:
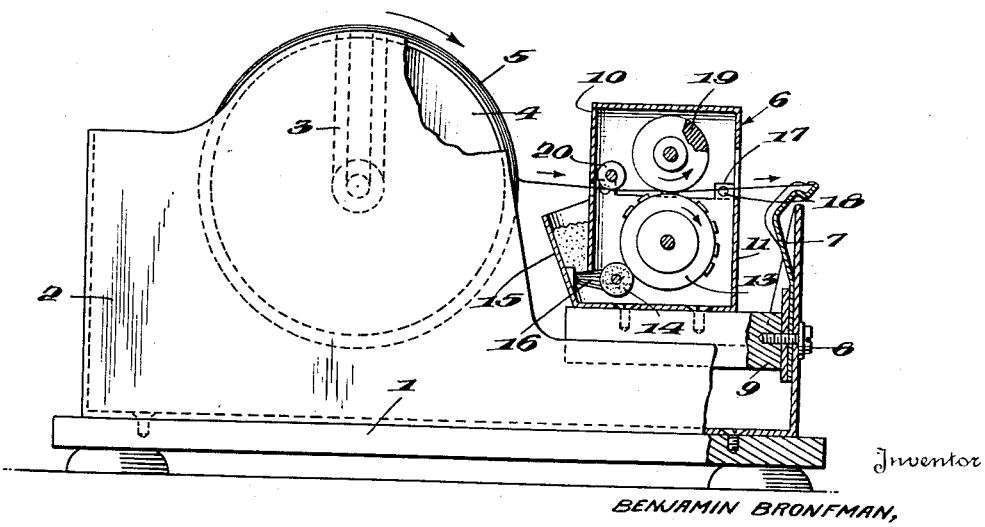
Figure 4 shows a side elevation with parts broken away of a preferred embodiment of apparatus combination for carrying out the process of this invention.

In the performance of the process, no special type of device is required to attain the novel article of the present invention. However, a relatively simple and particularly expedient apparatus involving a printing element and tape dispenser is that disclosed and claimed in my application No. 218,292 which has matured to Patent No. 2,223,907. It will be noted that the present application is a continuation in part of application No. 279,030, filed June 14, 1939, which latter application was copending with and a division of parent case No. 218,292 that has matured to patent. The showing of Figure 4 corresponds with the device of my prior patent, and is herein referred to merely in an illustrative capacity for teaching the performance of the process in accordance with the following description. While this device embodiment is desirable by virtue of its simplicity of operation, economy of performance, and the impressive results obtained as evidenced by the novel product, it is in no sense to be construed as restrictive of the scope of process or product invention herein.

In the drawing, 1 designates the base which carries the housing 2 attached by suitable screws. Bosses 3 extend inwardly within the housing to provide bearings at the bottom of the bosses for the tape carrying roller 4. The bosses are provided with slots to allow easy insertion and removal of the tape carrying roller. The pre-fabricated transparent adhesive tape 5 which comes on a blank is mounted on the roller 4.

The tape is drawn through a printing device generally designated as 6 where printing is applied to the sticky side of the tape and from which the tape is drawn to a cutter 7 where the required amount may be cut.

The cutter is held in position at the front part of the housing 2 by a screw 8 which also holds the supporting block 9 for the printing device.

The printing apparatus is desirably enclosed in a two-part housing 10, 11. The lower housing carries the printing roller 13 mounted in suitable bearings in the side walls thereof. Contacting the printing roller is a felt roller 14, also mounted in suitable bearings in the side walls, which applies the pigment to the printing roller.

Integral with the housing 11 is a pigment reservoir 15 which is open at its bottom to allow feeding of the pigment and may be closed at the top by any suitable means, as by a slide, not shown.

The open bottom of the reservoir is closed off by a brush 16 extending across the whole length of the opening. This prevents the pigment from dropping into housing 11. The brush 16 feeds the particles of pigment by gravity and by creeping action along the brush to the felt roller 14 from which it is picked up by the printing roller for application to the tape.

The top of the lower housing 11 has two projections 17 from its side wall which act as guides for initially aligning the tape in printing position and for keeping it so set. These projections also act as clasps by their inherent spring action which coact with buttons 18 on the housing 10 to maintain the upper housing in operative position.

The upper hinged housing 10 has a rubber roller 19 and a guide roller 20 rotatably mounted in the side walls thereof. The rubber roller is in line with and of such diameter relative to the printing roller that it will be slightly compressed at the point of contact between the two. This action presses the tape against the printing roller for obtaining a clear impression. Slots are provided in the end walls of housing 10 for the passage of the tape to and from the printing apparatus.

The brush 16 is an important feature in the proper application of the pigment. The vibration of the bristles as roller 14 rotates sets up vibrations throughout the pigment and prevents its caking. Also, the excess pigment is brushed from the roller 14.

It will, therefore, be clear, that the tape 5, desirably Scotch tape provided with a tacky, pressure sensitive adhesive on one surface thereof, which has been threaded between any suitable contact roller 19 and printing roll 13, with the adhesive surface in contact with the printing roll, will be supplied with the substantially dry pigment from reservoir 15. It is thus manifest that as the adhesive tape is being withdrawn from the roll supply for the purpose of severing the desired length on cutter 7, it is subjected to the impress of printed matter. Differently stated, as any strip of adhesive tape is segregated for wrapping purposes, by way of exemplification, it is supplied in legible, well-defined manner with any predetermined advertising print, with which the printing roller 13 is supplied.

In this manner, the requisite for a pre-printed tape is obviated, as are the uncertainties of supplying printing ink to an adhesive surface in accordance with the prior art methods. No collateral treatment is essential in the application of the pigmentary material to the tacky, pressure sensitive surface, it being merely essential that the appropriate ink be directly impressed upon the adhesive surface. Quite obviously, the width of adhesive tape utilized is essentially a matter of choice and may be varied dependent upon the dimensions of the particular device utilized in the performance of the process and obtention of the product.

While I have described my invention in accordance with the preferred embodiments of both product and process, it is apparent that many variations and modifications both as to product and procedural details and steps may be made without departing from the scope of equivalents within the purview and spirit of this invention as defined in the following claims.

Having thus set forth my invention, I claim:

1. The method of applying advertising print on an adhesive tape having a tacky, pressure sensitive adhesive surface, which comprises impressing a substantially dry pigment in discrete particle form directly on the said adhesive surface of the tape in accordance with predetermined legible print, and attaching the same adhesive surface to a predetermined surface.

2. The method of applying printed terminology to an article which comprises impressing on the adhesive coated surface of a transparent tape provided with a coating of a tacky, pressure sensitive adhesive powdered pigmentary print, and attaching the tacky surface of said tape to an article.

3. The process of printing upon an adhesive tape which comprises providing a transparent tape having a coating of a tacky, pressure sensitive adhesive, and impressing on said adhesive coating a substantially dry pigment ink powder by a printing roller provided with predetermined terminology.

4. The method of applying printed advertising matter and an adhesive seal to a package or article which comprises providing a roll supply of transparent adhesive tape having one surface coated with a tacky, pressure sensitive adhesive, withdrawing said tape from the roll supply in contact with a printing roller to which is supplied a pigment ink powder, the said adhesive surface of the tape passing in contact with said printing roller.

5. The method of supplying advertising matter to a transparent adhesive tape coated on one side with a tacky, pressure sensitive adhesive which comprises directly impressing onto said adhesive coating an ink in the form of discrete particles of predetermined printed matter.

6. The method of supplying advertising matter to a transparent adhesive tape coated on one side with a tacky, pressure sensitive adhesive which comprises directly impressing onto said tacky, pressure sensitive adhesive coating as predetermined printed advertising matter, a substantially dry pigment ink in the form of discrete particles.

7. The method of supplying printed matter to an adhesive tape which comprises impressing the printed matter in the form of powdered pigmentary ink on a surface of said tape coated with a tacky, pressure sensitive adhesive.

8. The method of supplying printed matter to the adhesive coating of a sheet having a surface coated with a pressure sensitive adhesive which comprises impressing printing ink in the form of discrete pigmentary particles on the adhesive coated surface of said sheet.

9. The process of printing upon the adhesive coating of a sheet having a surface coated with a pressure sensitive adhesive which comprises applying printing ink in the form of discrete particles of pigment to a printing roller, and impressing the so inked printing roller against said adhesive coating of the sheet.

10. The process of providing non-smearable printing upon the tacky, pressure sensitive adhesive coating of a sheet in a manner to avoid spreading and running of the ink which comprises applying powdered pigmentary particles to a printing roller, and impressing the so inked roller against the said adhesive coating of the sheet.

BENJAMIN BRONFMAN.